United States Patent
Burkhart et al.

(10) Patent No.: US 10,414,221 B2
(45) Date of Patent: Sep. 17, 2019

(54) DEVICE AND METHOD FOR DETECTING A PIVOT ANGLE BETWEEN A VEHICLE AND A TRAILER DEVICE

(71) Applicant: ZF Friedrichshafen AG, Friedrichshafen (DE)

(72) Inventors: Michael Burkhart, Ravensburg (DE); Thomas Rösch, Friedrichshafen (DE); Georges Halsdorf, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 317 days.

(21) Appl. No.: 15/322,363

(22) PCT Filed: Jun. 2, 2015

(86) PCT No.: PCT/EP2015/062215
§ 371 (c)(1),
(2) Date: Dec. 27, 2016

(87) PCT Pub. No.: WO2016/000893
PCT Pub. Date: Jan. 7, 2016

(65) Prior Publication Data
US 2017/0136839 A1    May 18, 2017

(30) Foreign Application Priority Data
Jul. 2, 2014   (DE) .................. 10 2014 212 821

(51) Int. Cl.
*B60D 1/62* (2006.01)
*B60D 1/06* (2006.01)
(Continued)

(52) U.S. Cl.
CPC .................. *B60D 1/62* (2013.01); *B60D 1/06* (2013.01); *B60D 1/245* (2013.01); *B60D 1/30* (2013.01); *G01S 3/14* (2013.01)

(58) Field of Classification Search
CPC . B60D 1/62; B60D 1/06; B60D 1/245; B60D 1/30; G01S 3/14
(Continued)

(56) References Cited

U.S. PATENT DOCUMENTS 8,013,759 B1    9/2011   Aid
2011/0018231 A1   1/2011   Collenberg
(Continued)

FOREIGN PATENT DOCUMENTS

DE    19964045 A1   7/2001
DE    10122562 C1   7/2002
(Continued)

OTHER PUBLICATIONS

International Search Report dated Sep. 1, 2015 in International Application No. PCT/EP2015/062215, 4 pages, German Language.
(Continued)

*Primary Examiner* — Harry K Liu
(74) *Attorney, Agent, or Firm* — Brinks Gilson & Lione

(57) ABSTRACT

The disclosure relates to a pivot angle detection device and a method for detecting a pivot angle between a vehicle and a trailer coupling device that is coupled to the vehicle. A transmitter is hereby provided, which is designed for producing an electromagnetic field, as well as a receiver which is designed to detect a field strength of the electromagnetic field, whereby the transmitter and receiver are arranged towards each other on the vehicle and trailer coupling device in such a way that a change of the pivot angle produces a dependent change in the field strength that is detected by the receiver. Additionally, an evaluation device for determining the pivot angle based on the detected field strength is also provided. The disclosure also relates to a transmitter, a receiver and an evaluation device, that are designed for this purpose.

20 Claims, 2 Drawing Sheets

Figure 1:
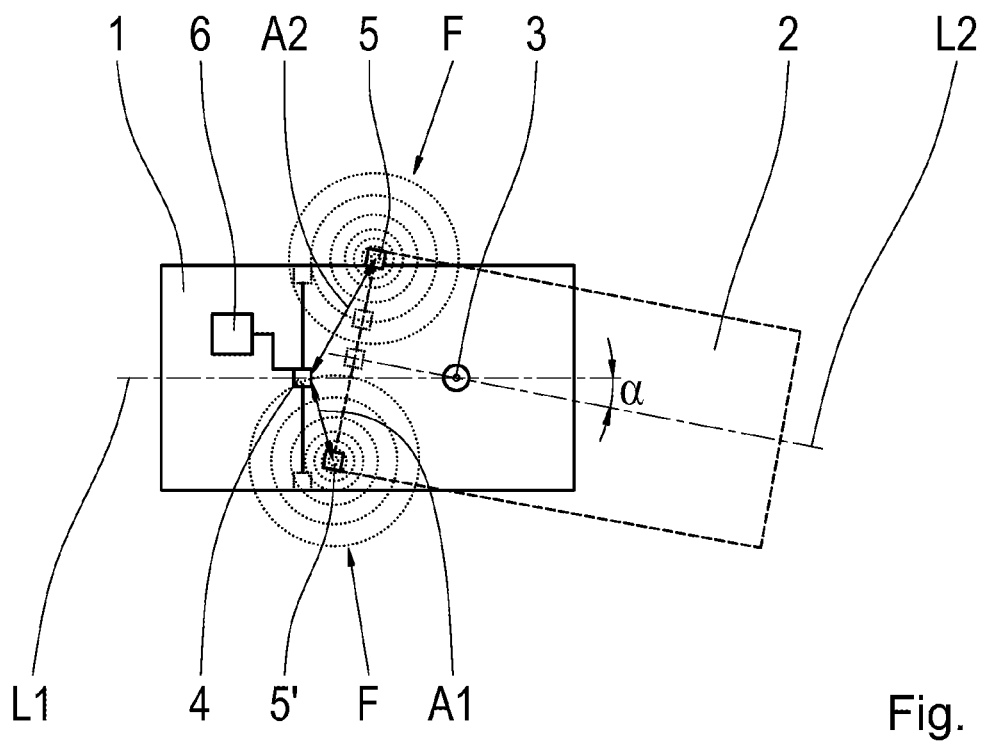

(51) Int. Cl.
  *B60D 1/24* (2006.01)
  *B60D 1/30* (2006.01)
  *G01S 3/14* (2006.01)

(58) Field of Classification Search
  USPC .......................................................... 342/417
  See application file for complete search history.

(56) References Cited

U.S. PATENT DOCUMENTS

| | | | |
|---|---|---|---|
| 2012/0185131 A1 | 7/2012 | Headley | |
| 2014/0267688 A1* | 9/2014 | Aich | H04N 7/181 348/113 |
| 2015/0314818 A1* | 11/2015 | Gaston | B62D 63/08 280/400 |

FOREIGN PATENT DOCUMENTS

| | | |
|---|---|---|
| DE | 102004025252 A1 | 12/2005 |
| DE | 102004059596 A1 | 6/2006 |
| DE | 102006040879 A1 | 3/2008 |
| DE | 102006056408 A1 | 6/2008 |
| DE | 102012214201 A1 | 1/2011 |
| EP | 1238577 A1 | 9/2002 |

OTHER PUBLICATIONS

International Search Report dated Sep. 1, 2015 in International Application No. PCT/EP2015/062215, 3 pages.
Written Opinion of the International Search Authority dated Sep. 1, 2015 in International Application No. PCT/EP2015/062215, 6 pages, German Language.
Office Action of Priority Application DE 10 2014 212 821.8 dated Feb. 10, 2015, 9 pages, German Language, with English translation on pp. 8-9.

* cited by examiner

DEVICE AND METHOD FOR DETECTING A PIVOT ANGLE BETWEEN A VEHICLE AND A TRAILER DEVICE

This application is a filing under 35 U.S.C. § 371 of International Patent Application PCT/EP2015/062215, filed Jun. 2, 2015, and claims the priority of DE 10 2014 212 821.8, filed Jul. 2, 2014. These applications are incorporated by reference herein in their entirety.

The disclosure relates to a pivot angle detection device for detecting a pivot angle between a vehicle and a trailer coupling device which is coupled to the vehicle. The disclosure also relates to a method for determining such a pivot angle, as well as to a transmitter, a receiver, and an evaluation device for such a pivot angle detection device.

Such a device is known from the DE 101 22 562 C1. Here, the pivot angle is determined by means of two ultrasound transmitters.

A device for the coupling of an apparatus to a work vehicle is known from the EP 1 238 577 A1. The device comprises a sensor device, by means of which it is possible to determine a relative position between an element on the side of the device and the coupling element on the vehicle side. The sensor device particularly includes magnetic sensors, ultrasound sensors, laser sensors, radar sensors and/or GPS sensors.

A driver assistance system is known from the DE 10 2006 040 879 A1. An RFID element can hereby be provided on a trailer coupling as well as another RFID elements on a trailer. Thereby it is possible to approach a trailer coupling device with pinpoint precision.

It is the objective of the disclosure to improve the ability to determine a pivot angle between a vehicle and a trailer coupling device that is coupled to the vehicle.

This objective is achieved by means of the characteristics of the main claims. Preferred embodiments thereof can be derived from the respective dependent claims. Accordingly, a pivot angle detection device for detecting a pivot angle between a vehicle and a trailer coupling device which is coupled to the vehicle is suggested.

This device comprises at least one transmitter, which is designed for generating an electromagnetic field, as well as one receiver, which is designed for detecting a field strength of the electromagnetic field. The transmitter and receiver are thereby arranged towards each other on the vehicle and trailer coupling device, that a change of the pivot angle produces a dependent change in the field strength that is detected by the receiver. Additionally, an evaluation device for determining the pivot angle based on the field strength that is detected by the receiver is also provided.

In this way, it is possible to determine the pivot angle in a simple and effective manner. The receiver and transmitter are particularly arranged in such a way that the field strength of the transmitter is changed in the detection range of the receiver whenever a change of the pivot angle occurs, e.g. in a quadratic or linear manner. This may be accomplished in particular by means of a pivot angle dependent screening of the transmitter or of the receiver, and/or by means of a pivot angle dependent variation of the distance between the receiver and the transmitter. The determination of the pivot angle in the evaluation device is carried out in particular by means of trigonometric calculations, characteristic diagrams or stored results of test series. The determination of the pivot angle based on the field strength can thus be carried out in an analytic or in an empiric manner. The pivot angle detection device is especially designed for detecting a pivot angle between the longitudinal axis of a vehicle and a longitudinal trailer axis of the trailer coupling device which is coupled to the vehicle. It is possible that the transmitter and the receiver are both arranged on one of these respective longitudinal axes, or alternatively, it is also possible that one of the receivers and transmitters is arranged on one longitudinal axis and the respective other one of the receivers and transmitters is arranged on the other side of the respective other longitudinal axis. Accordingly, one of the receivers and transmitters is arranged on the vehicle, while the other one of the receivers and transmitters is arranged on the trailer coupling device.

The pivot angle detection device can particularly comprise a coupling with a pivot axis, around which the trailer coupling device can be pivoted in relation to the vehicle by the pivot angle. The coupling may therefore refer to e.g. a fifth wheel coupling or a Rockinger coupling or a ball coupling. The pivot angle is zero especially when the longitudinal vehicle axis and the longitudinal trailer axis are parallel to each other. This may be the case in particular when the vehicle and trailer are driving straight-ahead. The pivot angle may therefore refer to a curve pivot angle between the vehicle or longitudinal vehicle axis and the trailer coupling device or longitudinal trailer axis, as it can occur during a ride around a curve. But the pivot angle may also refer to an inclination angle between the vehicle or longitudinal vehicle axis and the trailer coupling device or longitudinal trailer axis, as it can occur during an off-road ride or during an up- and down-hill ride.

The trailer coupling device refers in particular to a center axle drawbar trailer, a steering drawbar trailer or a semi-trailer. However, it is also possible to use the hitch for the coupling of the trailer coupling device as a device interface, particularly for agricultural and forestry implement, such as e.g. a tractor linkage drawbar or a three-point hitch. Accordingly, the trailer coupling device may also refer to a working implement, in particular to an agricultural or forestry working implement. The towbar can thus e.g. be a plow or a cutter bar or a rock picker or a dozer blade etc. The vehicle particularly refers to a tractor unit, such as e.g. a passenger motor vehicle, a truck, a tractor, etc. However, the vehicle itself may also be designed to be attached to a tractor unit. The vehicle can thus also refer to e.g. a dolly cart.

Preferably, the pivot angle detection device comprises at least two transmitters. The first transmitter is hereby arranged in the region of an upright edge of a first side of the vehicle or of the trailer coupling device, for example, on the driver side. And the second transmitter is then arranged in the region of an upright edge of a second side which is opposite to the first side of the vehicle or of the trailer coupling device, for example on a passenger side. This allows for an improvement of the detection of the pivot angle. It can be provided, that the receiver is placed on the longitudinal vehicle axis or on the longitudinal trailer axis, in particular on that part of the vehicle or trailer coupling device, on which the transmitter is not provided. This can further improve the detection of the pivot angle.

It is also possible that at least two receivers are provided, whereby the first receiver is arranged in the region of an upright edge of a first side of the vehicle or of the trailer coupling device, such as e.g. on the driver side. And whereby the second receiver is arranged in the region of an upright edge of a side which is opposite to the first side of the vehicle or of the trailer coupling device, such as e.g. on a passenger side. Preferably, it can be provided, that the transmitter is placed on the longitudinal vehicle axis or on the longitudinal trailer axis, particularly on that part of the vehicle or trailer coupling device, on which no receiver is provided. These measures can also improve the detection of the pivot angle.

Alternatively, it can be provided, that the transmitter is placed on one of the longitudinal vehicle axis and of the longitudinal trailer axis and the receiver on the respective other one of the longitudinal vehicle axis or of the longitudinal trailer axis. This is a further possibility to achieve a particularly good detection of the pivot angle.

Preferably, one or more of the above-mentioned transmitters refer to a Bluetooth, RFID, WLAN or NFC transmitter, thus to transmitters that are commercially standard in the IT industry. In this context, RFID refers to Radio Frequency Identification, WLAN refers to Wireless Local Area Network and NFC refers to Near Field Communication. Preferably, the transmitters are BLE transmitters (BLE=Bluetooth Low Energy), like a BLE tag. Alternatively, it is of course also possible to use another suitable transmitter that emits an electromagnetic field. The receiver is particularly designed to detect the specifically emitted electromagnetic field or the field strength that is emitted by the respective transmitter(s). The above-mentioned transmitter types have proven to be particularly well suited for the present application.

The disclosure of course also relates to a transmitter, a receiver as well as an evaluation device, which is particularly designed for the before-mentioned pivot angle detection device or for use in it.

The method for determining a pivot angle between a vehicle and a trailer coupling device which is coupled to the vehicle has the objective, that an electromagnetic field is produced by means of a transmitter and that this field strength is detected by means of the receiver, whereby the transmitter and receiver are thereby arranged towards each other on the vehicle and trailer coupling device, that a change of the pivot angle produces a dependent change in the field strength that is detected by the receiver. The pivot angle is then determined by means of the detected field strength.

The pivot angle between the vehicle and the trailer coupling device is determined in a wireless manner by means of the presented means. An additional wiring between the transmitter and the receiver is thus not necessary.

Figure 2:
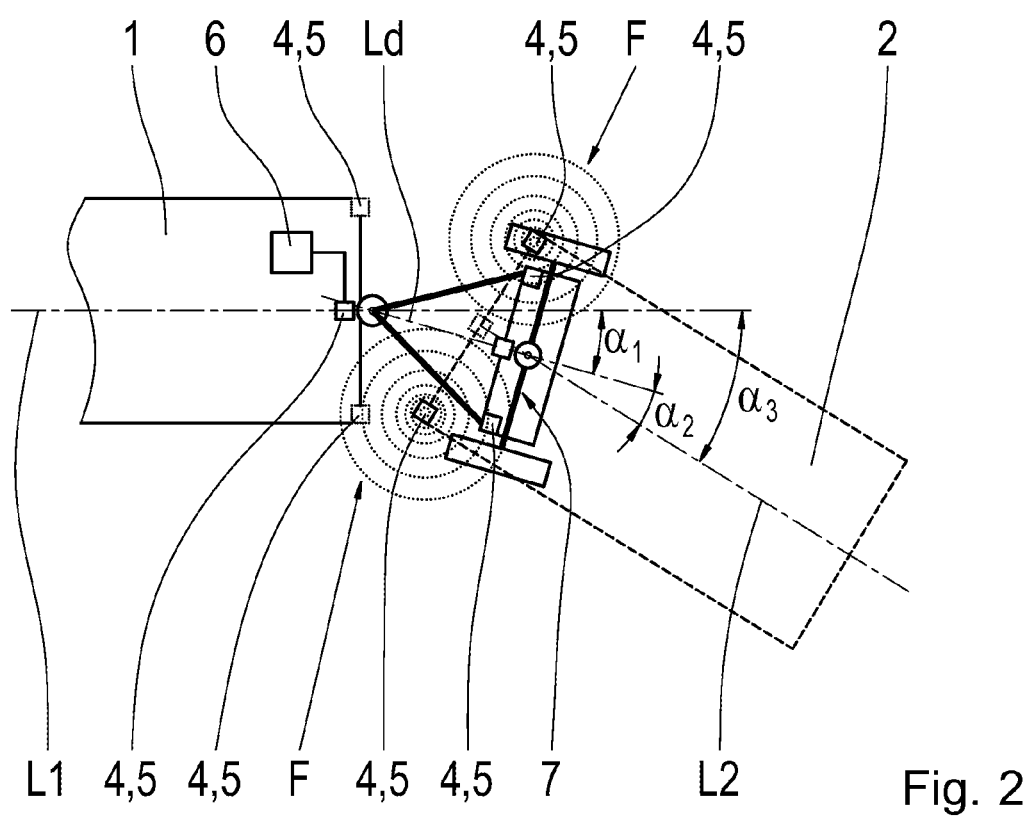
Figure 3:
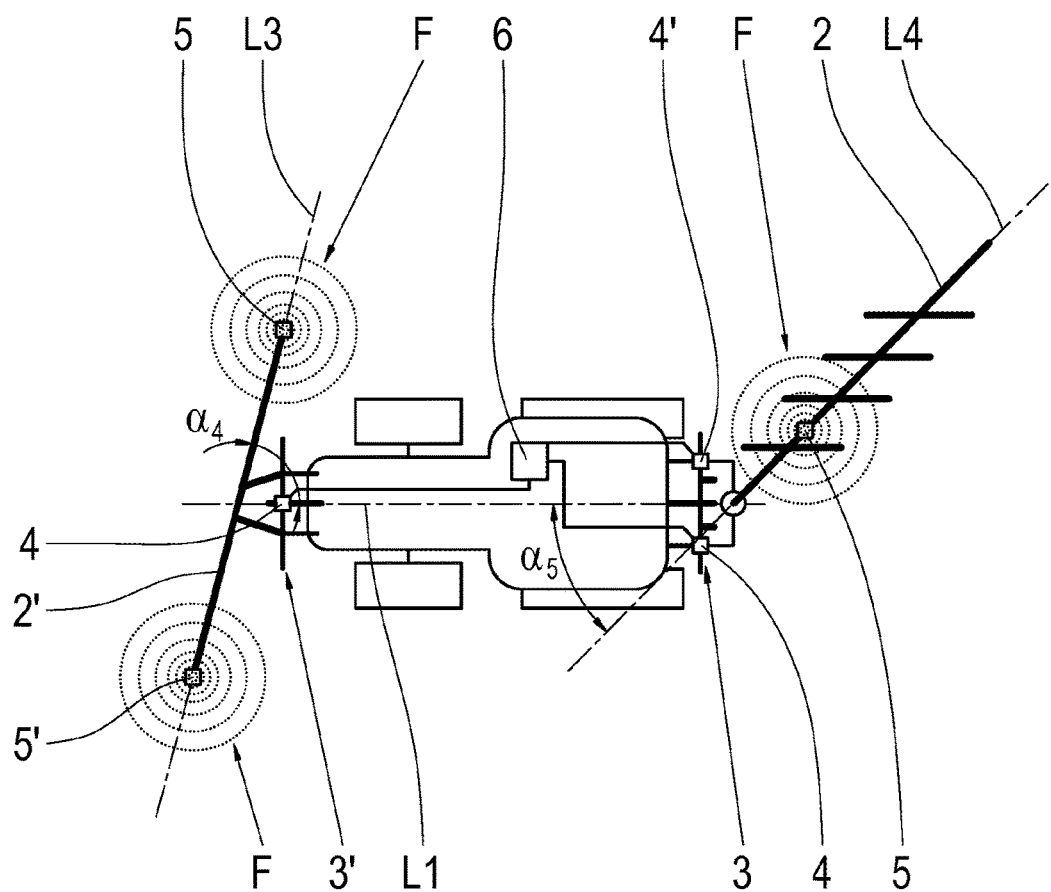

The disclosure is explained in more detail by means of following figures of advantageous embodiments of the disclosure, by means of which advantageous characteristics of the disclosure can be derived. The figures display in a respective schematic depiction:

FIG. 1, a top view of a trailer truck,

FIG. 2, a top view of a tractor unit with a coupled-on steering drawbar trailer, FIG. 3, a tractor coupled to a working implement.

Components in the figures, which are identical or which have an identical function, are identified with the same reference signs.

FIG. 1 depicts a pivot angle detection device for detecting a pivot angle $\alpha$ between a vehicle 1 and a trailer coupling device 2 which is coupled to the vehicle 1. In detail, the vehicle 1 refers to a truck and the trailer coupling device 2 refers to a semi-trailer. The pivot angle $\alpha$ is located between a longitudinal vehicle axis L1 of the vehicle 1 and a longitudinal trailer axis L2 of the trailer coupling device 2. To couple the trailer coupling device 2 to the vehicle 1, a coupling 3 is provided, in the depicted illustration a fifth-wheel coupling is shown. Coupling 3 has a pivot axis, which is located perpendicular to the drawing layer and around which the vehicle 1 and the trailer coupling device 2 can be pivoted in a pivot angle $\alpha$. The pivot angle $\alpha$ is zero when the vehicle 1 and trailer coupling device 2 are driving straight ahead. When driving around a curve, the pivot angle $\alpha$ increases in proportion of the driven radius of the curve.

The pivot angle detection device comprises at least one receiver 4, which is firmly arranged on vehicle 1, as well as a first and a second transmitter 5, 5' which are firmly arranged on the trailer coupling device 2. Each one of the transmitters 5, 5' is designed to emit an electromagnetic field F. The receiver 4 is designed to detect a field strength of the respective electromagnetic field F within its detecting range, particularly at an antenna of the receiver 4.

The transmitters 5 and receiver 4 are thereby arranged towards each other on the vehicle 1 and trailer coupling device 2, that a change of the pivot angle $\alpha$ produces a dependent change in the field strength of the electromagnetic field F that is detected by the receiver 4. In detail, the field strength of the electric fields F decreases with increasing distance from the respective transmitter 5. The further away the receiver 4 is from the respective transmitter 5, the lower the field strengths will be in the range of the receiver 4. In the depicted illustration, the transmitters 5 are thus arranged on the trailer coupling device 2 in such a way, that their position changes in relation to the position of the receiver 4 on the vehicle 1 depending on the pivot angle $\alpha$. During the pivoting of vehicle 1 and of trailer coupling device 2, as it is depicted in FIG. 1 (left hand curve), the distance A1 between receiver 4 and transmitter 5' is reduced. In contrast, the distance A2 between receiver 4 and transmitter 5 is increased. When vehicle 1 and trailer coupling device 2 are driving straight ahead, the distances A1 and A2 are identical. Thus, the field strengths of the fields F that are detected by receiver 4 are also identical. But in the position depicted in FIG. 1, the field strength of field F that is detected by receiver 4, and which was emitted by transmitter 5', is stronger than the field strength of field F that was emitted by transmitter 5. When the pivot angle $\alpha$ is increased, the field strength of the electromagnetic field that can be detected by receiver 4 changes accordingly.

The field strengths detected by receiver 4 are transmitted to the evaluation device 6. It determines the pivot angle $\alpha$ from it. This can be done e.g. by using trigonometric formulas, by characteristic diagrams or by means of the results of test series. The determination of the pivot angle $\alpha$ can thus be carried out in an analytic or in an empiric manner.

In the illustration of FIG. 1, receiver 4 is positioned in the vicinity of the longitudinal vehicle axis L1. On the other hand, the transmitters 5, 5' are arranged on the outer sides of the longitudinal trailer axis L2, in detail in the region of an upright edge of a respective side of the trailer coupling device. The receiver 4 is particularly arranged on a rear side of a driver's cabin wall, while the transmitters 5, 5' are arranged in the area of the respective upright edge on a front side of the trailer coupling device 2. It can be intended that one of the transmitters 5, 5' is omitted. It can also be intended that receiver 4 is arranged on the trailer coupling device 2, e.g. in the area of one the upright edges, where the transmitters 5, 5' are not positioned, or in the area of the longitudinal trailer axis L2. And it can be intended that the transmitters 5, 5' are arranged on the vehicle 1, in particular in the vicinity of the longitudinal vehicle axis L1 or in the area of the upright edges of a driver's cabin of the vehicle 1. It is also possible that two receivers 4 are intended, which are placed instead of the transmitters 5, 5' in FIG. 1, whereby it is then possible to arrange for one transmitter, which would be provided instead of receiver 4 in FIG. 1. Further boxes are depicted in FIG. 1 as possible locations for receivers and/or transmitters. Other positions are of course also possible. It is furthermore possible that the pivot angle dependent changes of the field strength of the fields F are caused in that the receiver 4 is shielded off from the electromagnetic fields F in dependence of the pivot angle. As a result, the field strength that is detected by it will also change in dependence of the pivot angle.

FIG. 2 depicts a top view of a vehicle 1 with a coupled-on steering drawbar trailer as trailer coupling device 2. Hereby a pivot angle detection device is provided to determine one of the pivot angles $\alpha 1$, $\alpha 2$, $\alpha 3$. $\alpha 1$ refers to a pivot angle between the longitudinal vehicle axis L1 of vehicle 1 and the longitudinal axis LD of a pivot plate of the trailer coupling device 2. The pivot angle $\alpha 2$ refers to a pivot angle between the longitudinal pivot plate axis LD and the longitudinal trailer axis L2 of the trailer coupling device 2. And the pivot angle $\alpha 3$ refers to a pivot angle between the longitudinal vehicle axis L1 and the longitudinal trailer axis L2. Vehicle 1 and/or the pivot plate 7 and/or the trailer coupling device 2 are therefore equipped in the same way as in FIG. 1, with at least one receiver 4 as well as one transmitter 5, 5'. In accordance with FIG. 1, the field strength that is respectively detected by the one or more receivers 4 is transmitted to an evaluation device 6, which determines the pivot angle $\alpha 1$, $\alpha 2$, $\alpha 3$ based on the respective field strength.

FIG. 3 depicts a configuration of the disclosure in which a pivot angle $\alpha 4$, $\alpha 5$ is determined between a longitudinal vehicle axis L1 of a vehicle and a longitudinal axis of a working implement L3, L4 of a trailer coupling device 2, 2' that is designed as working implement. Vehicle 1 can particularly refer to an agricultural or forestry vehicle, such as e.g. a tractor or a logger. Vehicle 1 is equipped with two couplings 3, 3', each for hitching a trailer coupling device 2, 2' on to vehicle 1. According to FIG. 3, coupling 3, 3' refers to e.g. a respective tractor linkage drawbar or to a three-point hitch. It is of course also possible that other kinds of trailer coupling devices are hitched to vehicle 1 by means of the couplings 3, 3' such as e.g. a center axle drawbar trailers or a steering drawbar trailer. The trailer coupling device 2' which is coupled on by means of coupling 3' in FIG. 3 is designed in form of a dozer blade. The trailer coupling device 2 which is coupled on by means of the rear coupling 3 in FIG. 3 is illustrated as a plow. It is obvious, that other types of trailer coupling devices 2, 2' can also be coupled onto vehicle 1.

Dozer blade 2' and the plow 2 feature a respective longitudinal axis of the working implement L3, L4. The essential parts of the trailer coupling devices 2, 2' are designed in such a way that they can be pivoted in relation to vehicle 1, so that they can be adjusted to the respective working conditions. Thus, the respective pivot angle $\alpha 4$, $\alpha 5$ changes in dependence of the pivoting position of the respective trailer coupling device 2, 2'.

According to FIG. 3, a pivot angle detection device is provided to determine the pivot angle $\alpha 4$, $\alpha 5$. It can be designed in the same way as the one in FIG. 1 or FIG. 2. On the dozer blade 2' for example, one respective transmitter 5, 5' is provided in the region of the side ends of the dozer blade 2', which emit a respective electromagnetic field F. The field strength of the respective field F in the range of the front coupling 3' can be detected by means of a receiver 4 which is positioned on the longitudinal vehicle axis L1. The field strength that is received by receiver 4 thus changes depending on the pivot angle $\alpha 4$. The detected field strength is transmitted to an evaluation device 6, in which the pivot angle $\alpha 4$ is determined thereof.

By means of an example, only one transmitter 5 is provided for the determining of pivot angle $\alpha 5$. It also emits an electromagnetic field F. Transmitter 5 is arranged on the longitudinal axis of the working implement L4 of the plow 2. Two receivers 4, 4' are intended in the vicinity of coupling 3 with a distance to the longitudinal vehicle axis L1. The field strength of the electromagnetic field F emitted by transmitter 5, which is detected by the respective receivers 4, 4', varies in dependence of the pivot angle $\alpha 5$. The respectively detected field strengths are transmitted to the evaluation device 6 by the receivers 4, 4', where the pivot angle $\alpha 5$ is determined by means of it. The positions of the receivers 4, 4' and of the transmitters 5, 5' can be exchanged with each other in both cases in FIG. 3 as well. It is also possible to place a receiver 4 on the trailer coupling device 2, 2' instead of a transmitter 5, whereby in that case, a transmitter must be provided on the vehicle 1, particularly in the vicinity of the coupling 3, 3', instead of the receivers 4, 4'. Other suitable positions for transmitter 5, 5' and receiver 4, 4' can be used as well.

As it is shown in FIGS. 1 to 3, one of the receivers and transmitters should be arranged in a stationary manner on the vehicle, while the respective other one of the transmitters and receivers is then arranged in a stationary manner on the trailer coupling device. To increase the accuracy of the pivot angle determination, it is possible to provide any number of further transmitters 5, 5' or receivers 4, 4' at appropriate locations of vehicle 1 or on trailer coupling device 2, 2'. The transmitters 5, 5' particularly refer to Bluetooth, RFID, WLAN, or NFC transmitters. Preferably, the transmitter 5, 5' are BLE transmitters (BLE=Bluetooth Low Energy), in particular to a BLE tag.

The transmitters 5, 5' preferably emit a unique identification code with their respective electromagnetic field F. Thus, based on each electromagnetic field F, it is possible to identify the transmitter 5, 5' that is emitting the respective field. In addition to the field strength, receiver 4, 4' can also identify the associated unique identification code. It is thus possible to determine the field strength of the electromagnetic field F of each transmitter 5, 5' at the location of the receiver 4. This information of the unique field strengths can then be used e.g. by means of generally known trigonometric calculations, etc., to determine the pivot angle $\alpha$.

For the power supply, the transmitters 5, 5' and/or the receivers 4, 4' are connected to the respective electrical system of vehicle 1 or of trailer coupling device 2. Alternatively, they can respectively be operated with batteries or have an own electrical generator to produce the electrical energy necessary to operate (energy harvesting).

It is to be noted, that is not only possible to determine a pivot angle between the respective vehicle 1 and the trailer coupling device 2, 2' by means of the presented pivot angle detection device, but that if necessary, it is also possible to determine a spacial position between the vehicle 1 and the trailer coupling device 2, 2'. This can be used in particular to maneuver vehicle 1 towards the respective trailer coupling device 2, 2' in order to couple it to vehicle 1. The pivot angle can also be an inclination angle between vehicle 1 and trailer coupling device 2, 2' or the respective longitudinal axes L1, L2, L3, L4, LD. In this way, it is possible to determine if e.g. plow 2 or dozer blade 2' in FIG. 3 are located in an elevated resting position or if they are set in a lowered working position.

REFERENCE SYMBOLS

1 Vehicle
2, 2' Trailer Coupling Device, Working Implement 3, 3' Coupling
4, 4' Receiver
5, 5' Transmitter
6 Evaluation Device
7 Pivot Plate
A1, A2 Distance
F Electromagnetic Field
L1 Longitudinal Vehicle Axis
L2 Longitudinal Trailer Axis
L3, L4 Longitudinal Axis of the Working Implement
Ld Longitudinal Axis of the Pivot Plate
α, α1, α2, α3, α4, α5 Pivot Angles

The invention claimed is:

1. A pivot angle detection device for detecting a pivot angle between a vehicle and a trailer coupling device which is coupled to the vehicle, the device comprising:
  a first transmitter and a second transmitter, wherein the first transmitter forms a first electromagnetic field and wherein the second transmitter forms a second electromagnetic field;
  a receiver that detects a first field strength of the first electromagnetic field and a second field strength of the second electromagnetic field,
  wherein the first transmitter, the second transmitter, and receiver are arranged such that a change of the pivot angle produces a dependent change in the first field strength and the second field strength that is detected by the receiver; and
  an evaluation device for determining the pivot angle based on the detected first field strength and the detected second field strength.

2. The pivot angle detection device according to claim 1, wherein the first transmitter is arranged in a region of an upright edge of a first side of the vehicle or in a region of an upright edge of a first side of the trailer coupling device and the second transmitter is arranged in a region of an upright edge of a second side which is opposite to the first side of the vehicle or of the trailer coupling device.

3. The pivot angle detection device according to claim 2, wherein the receiver is placed on a longitudinal vehicle axis or on a longitudinal trailer axis.

4. The pivot angle detection device according to claim 1, wherein the first transmitter is a Bluetooth, RFID, WLAN or NFC transmitter.

5. A transmitter designed for the pivot angle detection device according to the first transmitter of claim 1.

6. A receiver designed for the pivot angle detection device according to claim 1.

7. An evaluation device designed for the pivot angle detection device according to claim 1.

8. The pivot angle detection device according to claim 1, wherein the first transmitter and receiver are arranged towards each other.

9. The pivot angle detection device according to claim 1, wherein the first transmitter is configured to emit a unique identification code and the receiver is configured to identify the identification code.

10. The pivot angle detection device according to claim 1, wherein the evaluation device determines the pivot angle through at least one of trigonometric calculations, characteristic diagrams, and stored test results.

11. The pivot angle detection device according to claim 1, further comprising a coupling, wherein the coupling is one of a fifth wheel coupling, a Rockinger coupling, or a ball coupling.

12. The pivot angle detection device according to claim 1, wherein the pivot angle is a curve pivot angle between the vehicle and the trailer coupling device.

13. The pivot angle detection device according to claim 1, wherein the pivot angle is an inclination angle between the vehicle and the trailer coupling device.

14. The pivot angle detection device according to claim 1, wherein the field strength decreases with increasing distance between the first transmitter and the receiver.

15. The pivot angle detection device according to claim 1, further comprising a shield configured to at least partially screen the receiver from the electromagnetic field, wherein the dependent change in the field strength that is detected by the receiver is caused by the shield.

16. The pivot angle detection device according to claim 1, wherein the trailer coupling device comprises a trailer and a pivot plate attached to the trailer, wherein the pivot angle is between a longitudinal pivot plate axis and a longitudinal trailer axis.

17. The pivot angle detection device of claim 1, wherein the receiver is fixed to the vehicle, wherein the first transmitter is fixed to the trailer coupling device, and wherein the second transmitter is fixed to the trailer coupling device.

18. The pivot angle detection device of claim 1, wherein the receiver is fixed to the trailer coupling device, wherein the first transmitter is fixed to vehicle, and wherein the second transmitter is fixed to the vehicle.

19. A method for determining a pivot angle between a vehicle and a trailer coupling device which is coupled to vehicle, the method comprising:
  producing a first electromagnetic field through a first transmitter,
  producing a second electromagnetic field through a second transmitter,
  detecting a first field strength of the first electromagnetic field with a receiver, wherein the first transmitter and the receiver are arranged on at least one of the vehicle and trailer coupling device in such a way that a change of the pivot angle leads to a dependent change in the first field strength that is detected by the receiver,
  detecting a second field strength of the second electromagnetic field with the receiver, wherein the second transmitter and the receiver are arranged on at least one of the vehicle and trailer coupling device in such a way that a change of the pivot angle leads to a dependent change in the second field strength that is detected by the receiver, and
  determining the pivot angle based on the detected first field strength and the detected second field strength.

20. A pivot angle detection device for detecting a pivot angle between a vehicle and a trailer coupling device which is coupled to the vehicle, the device comprising:
  a transmitter, wherein the transmitter forms an electromagnetic field;
  a first receiver receiver that detects a first field strength of the electromagnetic field; and
  a second receiver spaced from the first receiver, wherein the second receiver detects a second field strength of the electromagnetic field,
  wherein the transmitter, the first receiver, and the second receiver are arranged such that a change of the pivot angle produces a dependent change in the first field strength and the second field strength respectively detected by the first receiver and the second receiver; and an evaluation device for determining the pivot angle based on the detected first field strength and the detected second field strength.

* * * * *